United States Patent [19]
Kodama et al.

[11] Patent Number: 4,970,611
[45] Date of Patent: Nov. 13, 1990

[54] VARIABLE TAPE SPEED HEAD-CARRIER DRUM CONTROL APPARATUS

[75] Inventors: Masafumi Kodama; Masanori Kojima; Akira Sano, all of Nagaokakyo, Japan

[73] Assignee: Mitsubishi Denki Kabushiki Kaisha, Tokyo, Japan

[21] Appl. No.: 236,988

[22] Filed: Aug. 26, 1988

[30] Foreign Application Priority Data

| Aug. 27, 1987 | [JP] | Japan | 62-213294 |
| Aug. 27, 1987 | [JP] | Japan | 62-213295 |
| Aug. 27, 1987 | [JP] | Japan | 62-213296 |
| Aug. 27, 1987 | [JP] | Japan | 62-213297 |

[51] Int. Cl.$^5$ .................. G11B 5/55; G11B 21/10
[52] U.S. Cl. .................. 360/77.16; 360/107; 360/77.17
[58] Field of Search ........... 360/77.16, 107, 109, 360/77.17

[56] References Cited

U.S. PATENT DOCUMENTS

| 4,318,142 | 3/1982 | Ravizza . | |
| 4,365,279 | 12/1982 | Kinjo | 360/109 |
| 4,446,497 | 5/1984 | Hirayama | 360/109 |
| 4,451,859 | 5/1984 | Noel . | |
| 4,485,414 | 11/1984 | Baker | 360/10.3 |
| 4,695,907 | 8/1987 | Inaji et al. | 360/107 |

FOREIGN PATENT DOCUMENTS

| 0037715 | 2/1981 | European Pat. Off. . | |
| 0145331 | 11/1984 | European Pat. Off. . | |
| 56-051021 | 5/1981 | Japan | 360/109 |
| 56-124116 | 9/1981 | Japan | 360/109 |
| 56-50329 | 11/1981 | Japan . | |
| 57-060527 | 4/1982 | Japan | 360/109 |
| 1579852 | 3/1977 | United Kingdom . | |
| 2193369A | 7/1987 | United Kingdom . | |

OTHER PUBLICATIONS

Millman, *Microelectronics: Digital and Analog Circuits and Systems*, 1979, pp. 564–565.

Primary Examiner—Vincent P. Canney
Assistant Examiner—David L. Robertson

[57] ABSTRACT

A head-carrier drum control apparatus in a magnetic recording and/or reproducing apparatus which comprises a rotatably supported head-carrier drum assembly; a drive unit accommodated in the head-carrier drum assembly including a coil, disposed in a magnetic circuit, and at least one positionable magnetic transducing head cooperable with the coil to be displaced in a direction generally widthwise of a length of magnetic tape. The apparatus further includes a contact feeler through which a control current is supplied to the drive unit; an electrode held in contact with the contact feeler and connected electrically with the coil; and a drive circuit for controlling the position of the transducer head so as to cause a trace of movement of the transducing head depicted during information reproduction to properly follow a track recorded by a magnetic transducing head on the length of magnetic tape during information recording.

10 Claims, 7 Drawing Sheets

VARIABLE TAPE SPEED HEAD-CARRIER DRUM CONTROL APPARATUS

CROSS-REFERENCE TO THE RELATED APPLICATION

U.S. patent application 07/236,944 filed concurrently herewith in the name of Masafumi KODAMA, Akira SANO and Masanori KOJIMA, assigned to the same assignee of the present invention and entitled "Head-carrier Drum Control System."

BACKGROUND OF THE INVENTION

1. Field of the Invention

The present invention generally relates to a magnetic tape recording and/or reproducing apparatus generally referred to as a video tape recorder and, more particularly, to a head-carrier drum control apparatus, used in the video tape recorder, of a type comprising at least one rotary magnetic recording and/or reproducing head supported for displacement in a direction generally widthwise of a length of magnetic recording medium to accomplish proper tracking for a high quality video reproduction.

2. Description of the Prior Art

It is well known that most video tape recorders of helical scan type now available in the market employ a generally cylindrical head-carrier drum assembly comprising rotary and stationary drum halves, the rotary drum half carrying a magnetic recording and/or reproducing head assembly for rotation together therewith. An example of the prior art head-carrier drum assembly is reproduced in FIG. 7 of the accompanying drawings in a schematic representation and will now be discussed with reference thereto.

Figure 7:
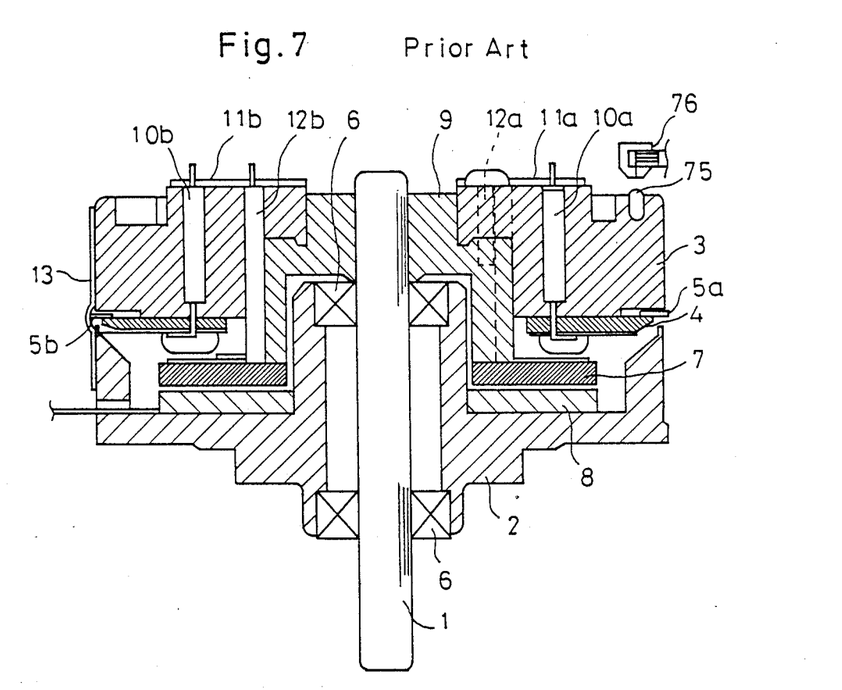
FIG. 7 is a longitudinal sectional view of the prior art head-carrier drum assembly.

Referring now to FIG. 7, the head-carrier drum assembly shown therein comprises a motor-coupled drive shaft 1, a stationary or lower drum half 2 fixedly mounted on a support framework (not shown) and carrying a pair of spaced apart bearings 6 through which the drive shaft 1 extends coaxially for rotation independently of the lower drum half 2, and a rotary or upper drum half 3 mounted on the drive shaft 1 through a support stock 9, rigid with the drive shaft 1, for rotation together therewith and in coaxial relation with the lower drum half 2, the lower drum half 2 having an outer diameter exactly equal to the outer diameter of the upper drum half 3. The upper drum half 3 carries a plurality of, for example, two, magnetic recording and/or reproducing heads 5a and 5b for rotation together therewith spaced 180° from each other about the axis of rotation of the upper drum half 3 that is defined by the drive shaft 1. These magnetic transducing heads 5a and 5b are secured from below to the upper drum half 3 by means of respective fixture plates 4 with tips of said transducing heads 5a and 5b confronting a circumferentially extending clearance between the lower and upper drum halves 2 and 3. Within the head-carrier drum assembly, sector-shaped transformers 7 are supported by the support stock 9 for rotation together with the drive shaft 1 or the upper drum half 3, and correspondingly sector-shaped transformers 8 cooperable with the upper transformers 7 are rigidly mounted on the lower drum half 2. A length of magnetic tape generally identified by 13 and reeled at opposite ends to supply and take-up reels (not shown) is, during use, wrapped helically around the head-carrier drum assembly while extending at a predetermined angle relative to the longitudinal axis of the head-carrier drum assembly.

In this illustrated prior art structure, the magnetic transducing heads 5a and 5b are positioned at respective predetermined locations spaced 180° from each other about the drive shaft 1 and retained by the upper drum half 3 with their tips protruding a slight distance outwards from the outer peripheral surface of the upper drum half 3. The magnetic transducing heads 5a and 5b are electrically connected with the upper transformers 7 through connectors 10a and 10b, then through printed wiring boards 11a and 11b and finally through connectors 12a and 12b, respectively. During a fixed speed rotation of the upper drum half 3 driven by the drive shaft 1 while the length of magnetic tape 13 is transported at a predetermined speed in one direction from the supply reel towards the take-up reel, the magnetic transducing heads 5a and 5b while alternately switched into operation scan that portion of the length of magnetic tape 13 which is then wrapped around the head-carrier drum assembly, thereby to either record or reproduce one or both of video information and audio information.

As described above, each upper transformer 7 is fixed to the support stock 9 rotatable together with the drive shaft 1 and is spaced a slight distance from and confronts the associated lower transformer 8 which is electrically connected with a signal processor (not shown in FIG. 7). During operation, the sector-shaped upper and lower transformers 7 and 8 are magnetically coupled to transmit a signal therebetween.

Referring still to FIG. 7, the upper drum half 3 has a magnet 75 mounted atop the upper drum half 3 adjacent an outer peripheral portion thereof, which magnet 75 is cooperable with a magnetic position sensor 76 supported immediately above the path of movement of the magnet 75 for detecting magnetic lines of force emanating from the magnet 75 thereby to provide a signal indicative of the position of the upper drum half 3 relative to the lower drum half 2.

The prior art head-carrier drum assembly of the construction described above operates in the following manner.

Figure 8:
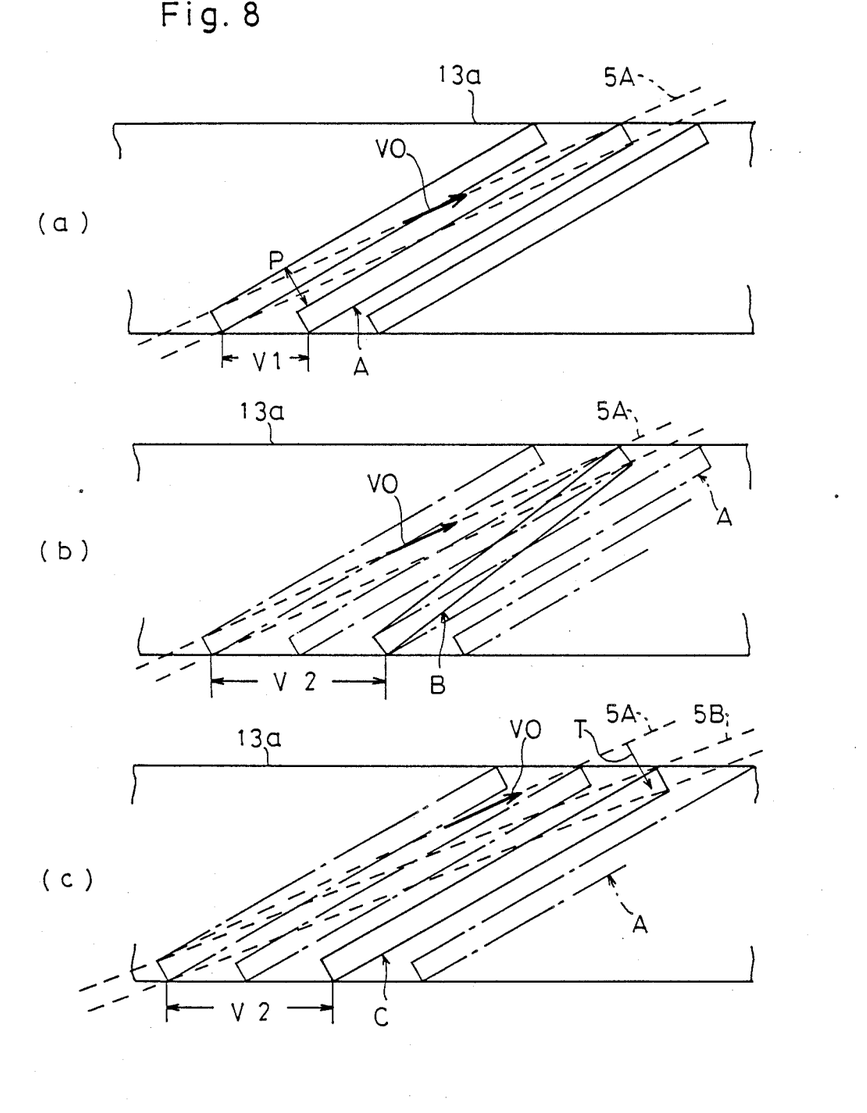
FIG. 8 is a diagram showing different arrangements of traces of movement of the magnetic transducing heads depicted on the length of magnetic tape.

During information recording or reproduction, the magnetic transducing heads 5a and 5b successively scan the length of magnetic tape 13 in a direction slantwise with respect to the longitudinal axis of the length of magnetic tape 13 while depicting successive traces which are parallel to each other as shown in FIG. 8. It is to be noted that the traces of movement of the magnetic transducing heads relative to the movement of the length of magnetic tape 13 are generally referred to as the recorded tracks on the length of magnetic tape 13 when the latter is used for reproduction of previously recorded information and referred to as the recording tracks on the length of magnetic tape 13 when the latter is used for recording information thereon.

In FIG. 8, reference numeral 13a represents a trace of movement of the length of magnetic tape 13; reference character V1 represents the speed of movement of the length of magnetic tape 13 during information recording or reproduction; reference numeral 5A represents a trace of movement of any one of the magnetic transducing heads 5a and 5b relative to the length of magnetic tape 13; and reference character V0 represents the direction of movement of any one of the magnetic transducing heads 5a and 5b. As shown, the trace 13a of movement of the length of magnetic tape 13 and the trace 5A of movement of any one of the magnetic transducing heads 5a and 5b generally intersect with each other at a predetermined angle.

Accordingly, tracks depicted by any one of the magnetic transducing heads 5a and 5b on the length of magnetic tape 13 during the information recording or normal information reproduction are such as generally identified by A in FIG. 8(a) and the space P between the neighboring traces A represents a track pitch. However, when the speed of movement of the length of magnetic tape 13 is increased during information reproduction from the value V1 to a higher value V2 such as occurring when an operator selects a high speed search mode to skip a video program being reproduced and to locate the succeeding video program, or during a high speed picture reproduction or quick-motion picture reproduction, the traces of movement of any one of the magnetic transducing heads 5a and 5b depicted on the length of magnetic tape 13 will be such as shown by B in FIG. 8(b).

Thus, it is well known that, while the peripheral velocity of any one of the transducing heads 5a and 5b is fixed at a predetermined value, the length of magnetic tape 13 is transported at a speed different from that during the normal information reproduction such as occurring during any one of the search mode, a quick-motion picture reproduction, a slow-motion picture reproduction or a still or frozen picture reproduction. During such operation, if any one of the magnetic transducing heads 5a and 5b fail to properly follow the recorded tracks on the length of magnetic tape 13, signals picked up by the magnetic transducing heads 5a and 5b are lowered in level. The consequence is the reproduction of video and audio information of reduced quality and also the appearance of noise bars in the video display.

In order to substantially eliminate the above discussed problems, attempts have hitherto been made to permit the magnetic transducing heads to be displaceable according to the change of the speed of movement of the length of magnetic tape, or tape speed for short, relative to that during the normal picture reproduction or, more precisely, relative to the tape speed at which the length of magnetic tape had been transported during the information recording. For example, the Japanese Patent Publication examined No. 56-50329, published Nov. 28, 1981, discloses the use of two head position control elements each capable of displacing in dependence on the magnitude of an electric signal applied thereto and having a respective movable member. The magnetic transducing heads are secured to the rotary drum half through the respective movable members of the head position control elements so that, when an electric signal appropriate to a particular operating mode such as a high speed search mode or a slow-motion picture reproduction is applied to the head position control elements, the magnetic transducing heads 5a and 5b can be displaced in a direction parallel to the axis of rotation of the rotary drum half to allow the magnetic transducing heads to properly follow the discrete parallel tracks on the length of magnetic tape.

U.S. Pat. No. 4,318,142, patented Mar. 2, 1982, to Raymond F. Ravizza, discloses the automatically compensated movable head servo circuit wherein, in order to cause the magnetic transducing head to accurately follow the tracks during the picture reproduction and, at the completion of the picture reproduction from the tracks, to properly position the magnetic transducing head in position to either reproduce the next adjacent successive track, reproduce the same track or reproduce another track so that the appropriate special motion effect can be achieved, a technique is employed to apply a small oscillatory motion to the magnetic transducing head to cause it to vibrate laterally of the track, to examine the resulting modulation of the reproduced signal's envelope to generate a tracking error correction signal and to apply the error correction signal to the magnetic transducing head.

U.S. Pat. No. 4,451,859, patented May 29, 1984, to Stan L. Noel discloses a magnetic head position control system wherein a constant control potential is applied to a positionable magnetic transducing head during information recording to hold the magnetic transducing head fixed. The position of the magnetic transducing head relative to the tracks on the length of magnetic tape is controlled during picture reproduction in dependence on signals reproduced from the tracks on the length of magnetic tape.

Figure 9:
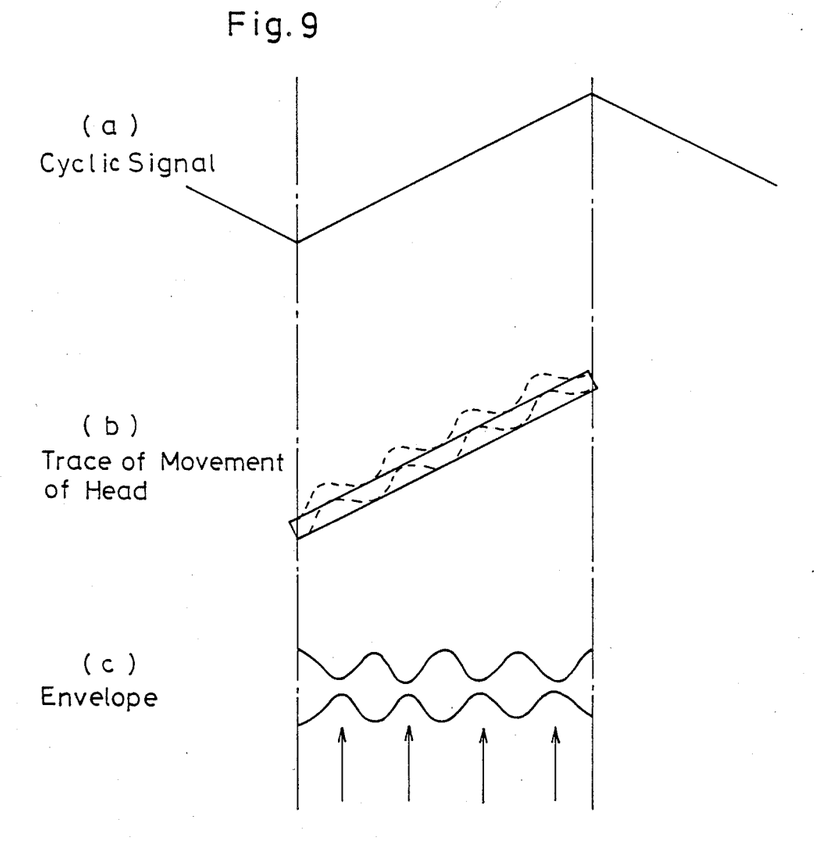
FIG. 9 is a graph illustrating a waveform of a cyclic signal and the relationship between the trace of movement of the transducing heads and a signal envelope when the transducing heads undergo mechanical resonance.

The above discussed prior art systems employ a drive unit including a head position control element necessitated either to displace the magnetic transducing head such as in the first mentioned publication or to cause the magnetic transducing head to finely oscillate such as in the second and last mentioned publication, which drive unit referred to above has a mechanical resonant frequency peculiar to such drive unit. Since in any one of the above discussed prior art systems the drive unit is driven at a frequency associated with the cycle of rotation of the head-carrier drum, that is, the rotary drum half, with no particular care paid to the mechanical resonant frequency peculiar to the drive unit, the drive unit tends to undergo mechanical resonance at a high frequency region and, therefore, the trace of movement of the magnetic transducing head during picture reproduction fluctuates, as shown by the broken line in FIG. 9(b), relative to the trace of movement of the magnetic transducing head depicted during information recording as shown by the solid line in FIG. 9(b). The consequence is that proper tracking cannot be maintained and, therefore, the envelope of the reproduced signal oscillates, as shown in FIG. 9(c), and is accompanied by the generation of noises at each neck region (region of small amplitude) of the envelope which thereby causes a reduced signal-to-noise ratio.

Also, when the drive unit is driven by a voltage of a frequency including a fundamental drive frequency thereof, a loss of the resistance of the head position control elements multiplied by the second power of the control current applied to the head position control elements of the drive unit, accompanied by the self-heating of the head position control elements. Once this self-heating occurs, the ambient temperature changes to such an extent as to result in change in resistance of the head position control elements and, also, change in contact resistance between contact elements and associated electrodes, both used to supply the control current there through to the drive unit. Once the resistance of the head position control elements and/or the contact resistance between the contact elements and the associated electrodes vary as discussed above, the supply of the control current to the drive unit is no longer stabilized, resulting in improper head-to-tape tracking accompanied by the generation of noise bars in the video display.

SUMMARY OF THE INVENTION

Therefore, the present invention has been devised with a view to substantially eliminating the above described problems and disadvantages inherent in the prior art head-carrier drum control systems and is aimed at providing an improved head-carrier drum control system wherein the occurrence of improper tracking during picture reproduction which would result from the change in resistance of the drive unit and the mechanical resonance of the drive unit is effectively minimized irrespective of change in tape speed, thereby to provide substantially noiseless picture reproduction of high signal-to-noise ratio.

A second important object of the present invention is to provide an improved head-carrier drum control system of the type referred to above, wherein the control signal can be rectilinearly supplied to the drive unit irrespective of the status of the drive unit, to thereby ensure noiseless picture reproduction in a stabilized manner.

In order to accomplish the above described objects of the present invention, the improved head-carrier drum control system comprises a rotatably supported, generally cylindrical head-carrier drum assembly including rotary and stationary drum portions; a drive unit accommodated in the head-carrier drum assembly including a coil, disposed in a magnetic circuit, and a positionable magnetic transducing head cooperable with the coil to displace in a direction generally widthwise of a length of magnetic tape; a contact feeler through which a control signal is supplied to the drive unit; and an electrode means held in contact with the contact feeler and connected electrically with the coil.

In accordance with the present invention, the head-carrier drum control system is provided with a drive circuit for supplying a control signal, based upon an electric current, required to drive the drive unit at a frequency associated with the cycle of rotation of the head-carrier drum assembly and at a frequency at least about a fundamental drive frequency through a current-based drive operation to cause a trace of movement of the transducing head depicted during information reproduction to properly follow a trace of movement of the transducing head depicted during information recording.

According to the present invention, regardless of the self-heating of the coil, which would result from when the coil is driven by an electric current of relatively high output impedance and, also, regardless of the change of both of the resistance of the coil and the contact resistance between the contact feeler and the electrode means resulting from the change in ambient temperature, the supply of the control current of a predetermined value can be supplied in a stabilized manner to the drive unit and, as a result thereof, the transducing head can be repositioned to cause the transducing head to properly follow any one of tracks recorded on the length of magnetic tape, that is, to accomplish proper tracking. Because of this, a picture can be reproduced in a video display with substantially no appearance of noise bars.

Also, the provision of the drive circuit for supplying a control signal, based upon an electric voltage required to drive the drive unit at a frequency associated with the cycle of rotation of the head-carrier drum assembly and at a frequency at least about the frequency of mechanical resonance of the drive unit through a voltage-based drive operation is effective in that, when the drive unit is to be driven by the control signal having higher harmonic components (or noises) of the high frequency about the mechanical resonant frequency through a voltage-based drive operation, a counter electromotive force having a frequency component equal to the mechanical resonant frequency can be generated across the coil incident to the mechanical resonance of the coil occurring in the magnetic circuit. This counter electromotive force so generated counteracts the drive voltage of relatively low output impedance to exhibit a short-circuited braking effect by which the mechanical resonance of the drive unit including the transducing head can be effectively controlled. Therefore, the tracking control during picture reproduction can be stabilized to ensure noiseless picture reproduction in the video display.

Moreover, according to another preferred embodiment of the present invention, the head-carrier drum control system is provided with a first drive circuit for supplying a control signal, based upon an electric current, required to drive the drive unit at a fundamental drive frequency associated with the cycle of rotation of the head-carrier drum assembly through a current-based drive operation. The system is further provided with a second drive supplying a control signal, based upon an electric voltage, required to drive the drive unit at a frequency at least about a mechanical resonant frequency through a voltage-based drive operation, so that the gain relative to a load resistance during the current drive can be made equal to the gain relative to a load resistance during the voltage drive. According to this second embodiment, the linearity of the control signal to be applied to the electrode means can be maintained during the current drive and also during the voltage drive to thereby permit the control signal to be linearly supplied to the drive unit to thereby eventually accomplish proper tracking regardless of the status of drive, i.e., the current drive or the voltage drive.

BRIEF DESCRIPTION OF THE DRAWINGS

The present invention will become more clearly understood from the following description of a preferred embodiment thereof when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

It is to be noted that the component parts identified by 1 to 3 and 6 to 13 in FIGS. 1 to 4 are identical with the component parts identified by like reference numerals in and described with reference to FIG. 7 and, therefore, will not be reiterated for the sake of brevity.

Figure 1:
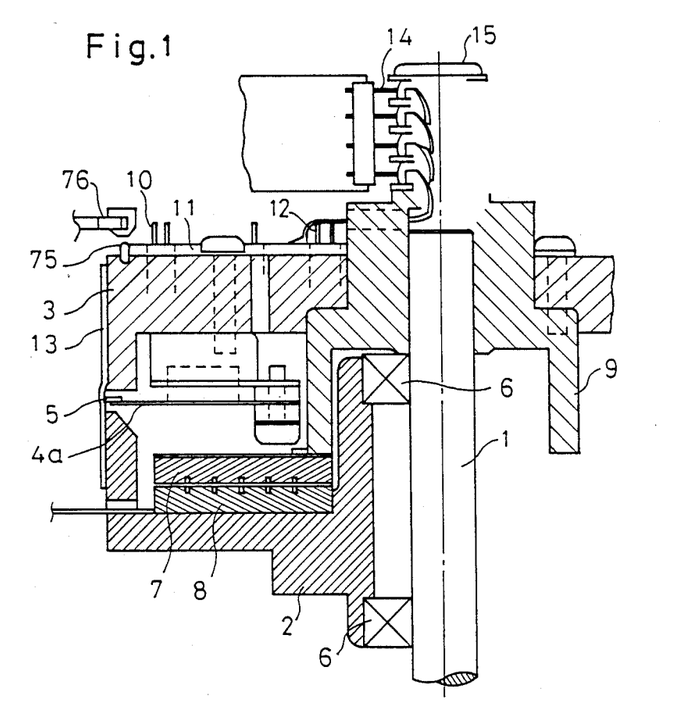
FIG. 1 is a schematic longitudinal sectional view of a portion of a head-carrier drum assembly embodying the present invention.
Figure 2:
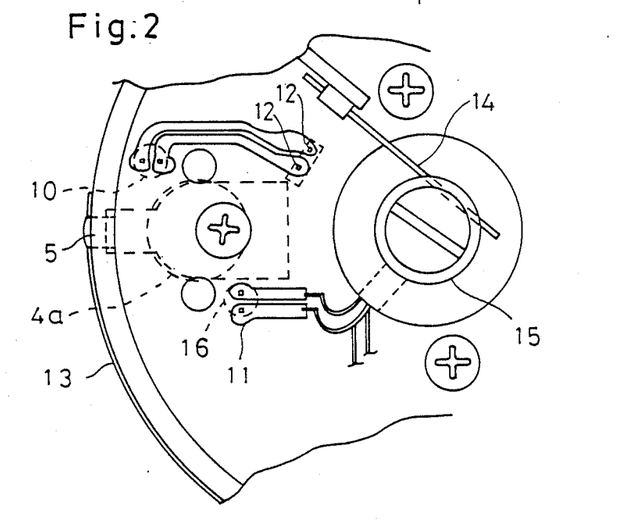
FIG. 2 is a top plan view of that portion of the head-carrier drum assembly shown in FIG. 1.

Referring first to FIGS. 1 and 2, and in the embodiment shown therein according to the present invention, each of the magnetic transducing heads 5 shown therein is supported by a drive unit 4a which is in turn connected to the rotary or upper drum half 3 for movement in a direction substantially parallel to the drive shaft 1 so that the respective magnetic transducing head 5 can be permitted to displace together with the drive unit 4a in a direction generally widthwise of the length of magnetic tape 13.

A contact feeler 14 having a plurality of contact brushes is fixedly supported by the stable member (not shown) above the rotary or upper drum half 3 with contact brushes slidingly engaged to corresponding electrodes forming an electrode means 15. The electrode means 15 including the electrodes slidingly engaged with the contact brushes of the contact feeler 14 is mounted, or otherwise formed, on the support stock 9 for rotation together therewith and, therefore, a control current to be supplied to the drive unit 4a can be supplied through the brushes of the contact feeler 14 and then through the associated electrodes of the electrode means 15. The electrode means 15 is in turn connected electrically with the drive unit 4a through the printed wiring board 11 and then through a connector 16.

Figure 3:
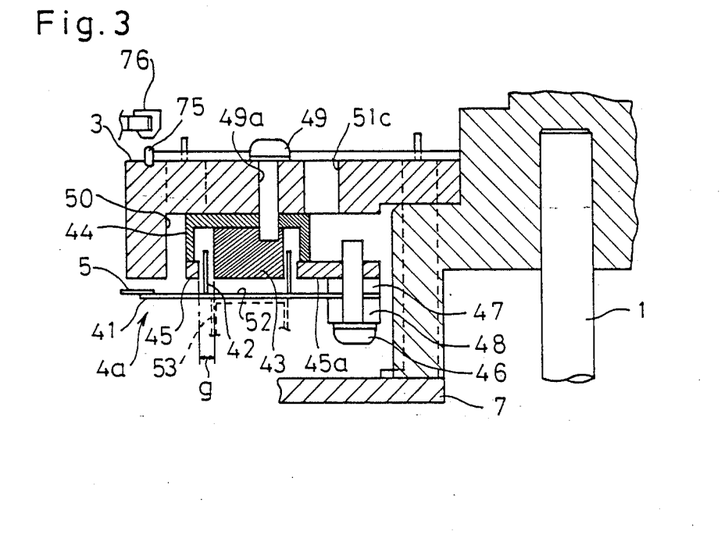
FIG. 3 is a schematic longitudinal sectional view showing a portion of the head-carrier drum assembly in detail.
Figure 4:
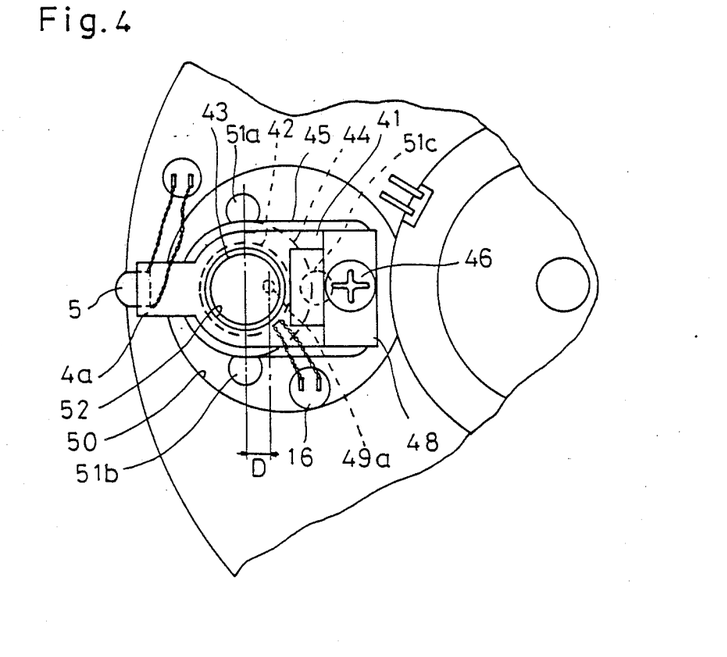
FIG. 4 is a bottom plan view of that portion of the head-carrier drum assembly shown in FIG. 3.

With particular reference to FIGS. 3 and 4, the upper drum half 3 has a cross-sectional shape generally similar to the inverted shape of a figure "U" having an annular cavity 50 defined therein so as to open downwards towards the stationary or lower drum half 2. The drive unit 4a for each transducing head 5 is accommodated within the cavity 50 in the upper drum half 3 and comprises a generally elongated leaf spring 41 made of non-magnetizeable material carrying the respective transducing head 5 at a free end thereof, the opposite end of said leaf spring 41 being secured to the upper drum half 3 in a manner as will be described later by means of a set bolt 46. The leaf spring 41 has a generally cylindrical coil assembly 42 mounted thereon and having a centerline parallel to the drive shaft 1 so as to protrude towards the cavity 50. The drive unit 4a is comprised of the transducing head 5, the leaf spring 41 and the coil assembly 42.

Secured to the upper drum half 3 by means of a screw member 49 and positioned inside the cavity 50 immediately above the cylindrical coil assembly 42 is a generally cap-shaped yoke member 44 made of ferromagnetic material. This yoke member 44 is of a generally U-shaped cross-sectional configuration opening downwards towards the leaf spring 41 and has a cylindrical magnet 43 secured thereto in coaxial relationship so as to protrude loosely into the hollow of the cylindrical coil assembly 42, as best shown in FIG. 3, while an annular gap is formed between the permanent magnet 43 and the coil assembly 42. As will become clear from the subsequent description, a magnetic force emanating from the permanent magnet 43 and that emanating from the coil assembly 42 cooperate with each other to drive the leaf spring and, hence, the transducing head 5 in a direction towards and away from the permanent magnet 43 thereby to displace and reposition the transducing head 5.

The yoke member 44 has a ferromagnetic plate 45 having an opening defined therein and secured from below to the yoke member 44 with the opening aligned coaxially with the permanent magnet 43, which ferromagnetic plate 45 cooperates with the permanent magnet 43 to form a magnetic circuit. This ferromagnetic plate 45 has an extension arm 45a extending in a direction away from the transducing head 5. The opposite end of the leaf spring 41 remote from the transducing head 5 is secured to the extension arm 45a by means of the set bolt 46 threaded thereto with an annular spacer 47 positioned between the extension arm 45a and the leaf spring 41 and also with an annular washer 48 positioned between the head of the set bolt 46 and the leaf spring 41.

It will readily be understood that the free end of the leaf spring 41 is displaceable in a direction generally parallel to the drive shaft 1 relative to the opposite end thereof that is secured to the upper drum half 3 through the extension arm 45a and the yoke member 44. The annular gap defined between the coil assembly 42 and the permanent magnet 43 has a width sufficient to avoid any possible interference therebetween during the displacement of the coil assembly 42 relative to the permanent magnet 43, which displacement takes place when a control current is supplied to the coil assembly 42 to develop a magnetic flux interacting with that produced by the permanent magnet 43. Incident to the displacement of the coil assembly 42, the leaf spring 41 is correspondingly displaced with the consequent displacement of the transducing head 5 in a direction generally widthwise of the length of magnetic tape 13.

The drive unit 4a according to the present invention can be assembled in the following manner. The leaf spring 41 has a centering perforation 52 of a generally circular shape defined at a generally central portion thereof for the passage of a cylindrical jig shown by the phantom line 53 in FIG. 3. When and while the cylindrical jig 53 is passed through the centering perforation 52 until it is brought into contact with the cylindrical permanent magnet 43, the cylindrical coil assembly 42 can be accurately centered relative to the permanent magnet 43 within an annular gap g defined between the permanent magnet 43 and the peripheral lip region of the opening defined in the ferromagnetic plate 45. The assembly including the yoke member 44 carrying the permanent magnet 43 and the leaf spring 41 carrying the coil assembly 42 is then fitted to the extension arm 45a by fastening the set bolt 46 to secure the opposite end of the leaf spring 41 to the extension arm 45a, thereby completing the drive unit 4a in which the cylindrical coil assembly 41 is exactly centered with the permanent magnet 43.

The drive unit 4a so assembled with the yoke member 44 and the ferromagnetic plate 45 as hereinabove described is then inserted into the cavity 50 in the upper drum half 3 with the yoke member 44 oriented upwards, and the screw member 49 is then fastened to secure the yoke member 44 firmly against an annular top wall of the upper drum half 3, thereby completing the fitting of the drive unit 4a to the upper drum half 3.

After the complete fitting of the drive unit 4a, the necessity may arise to finely adjust the position of the transducing head 5 relative to the head-carrier drum assembly and also the amount of protrusion of the tip of the transducing head 5 radially outwardly from the head-carrier drum assembly. For this purpose, the annular top wall of the upper drum half 3 has three adjustment holes 51a, 51b and 51c defined therein. These adjustment holes 51a to 51c and the transducing head 5 are so positioned, when viewed from top as shown in FIG. 4, that the imaginary line drawn so as to connect between the adjustment holes 51a and 51b and the imaginary line drawn so as to connect between the transducing head 5 and the adjustment hole 51c can intersect orthogonally with each other at a point which should align with the longitudinal axis of the permanent magnet 43. A bearing hole 49a through which the screw member 49 extends to secure the drive unit 4a against the annular top wall of the upper drum half 3 as hereinbefore described is defined at a position spaced a predetermined distance D radially inwardly from the point of intersection of the imaginary lines referred to above.

After the drive unit 4a employed in association with each transducing head 5 has been temporarily secured to the upper drum half 3 within the cavity 50 by passing the screw member 49 through the bearing hole 49a, positioning wedge members (not shown) are inserted into the respective adjustment holes 51a to 51c so that rotational forces can be produced from the adjustment holes 51a and 51b to adjust the posture of the transducing head 5 in a direction circumferentially of the head-carrier drum assembly and to cause the adjustment hole 51c to adjust the amount of protrusion of the tip of the transducing head 5 radially outwardly from the outer peripheral surface of the upper drum half 3. By so doing, the position of the drive unit 4a relative to the upper drum half 3 can be accurately adjusted, this positional relationship being maintained when the screw member 49 is subsequently firmly fastened to draw the drive unit 4a rigidly against the annular top wall of the upper drum half 3.

Referring to the magnetic circuit of high magnetic flux comprised of the permanent magnet 43, the yoke member 44 and the ferromagnetic plate 45, the cylindrical coil assembly 42 positioned inside the annular gap g between the permanent magnet 43 and the peripheral lip region of the ferromagnetic plate 45 around the opening thereof, when supplied with the control signal, develops a magnetic force which cooperates with the permanent magnet 43 to displace the leaf spring 41 and, hence, the magnetic transducing head 5. In order to avoid the magnetic transducing head 5 from being adversely affected by a portion of the magnetic flux leaking from the coil assembly 42 towards the transducing head 5, the position of the extension arm 45a of the ferromagnetic plate 45 is so selected as to be distant from the magnetic transducing head 5 as hereinbefore described.

Hereinafter, the operation of the above apparatus will be described. Assuming that the speed of movement of the length of magnetic tape 13 is increased from the tape speed V1 to the tape speed V2 for the purpose of effecting, for example, high speed search, and when the magnetic transducing head 5 is displaced from a fixed position in a direction shown by the arrow T in FIG. 8(c), that is, in a direction generally widthwise of the length of magnetic tape 13, to change the trace of movement of the transducing head 5 from the position 5A to the position 5B, the trace of relative movement between the length of magnetic tape 13 and the transducing head 5 will be such as shown by C in FIG. 8(c) and coincides with the track A recorded on the length of magnetic tape 13 during the picture recording, thereby accomplishing a proper tracking.

A similar description applies even when the tape speed is changed to a value other than the tape speed mentioned above. Thus, when during the reproduction mode the tape speed is selected to be a value other than the tape speed at which the discrete parallel recorded tracks are formed on the length of magnetic tape 13, proper tracking can be achieved by displacing the transducing heads 5 in the same direction generally widthwise of the length of magnetic tape 13 to reposition the transducing heads 5 so as to cause the latter to properly follow the recorded tracks.

Figure 5:
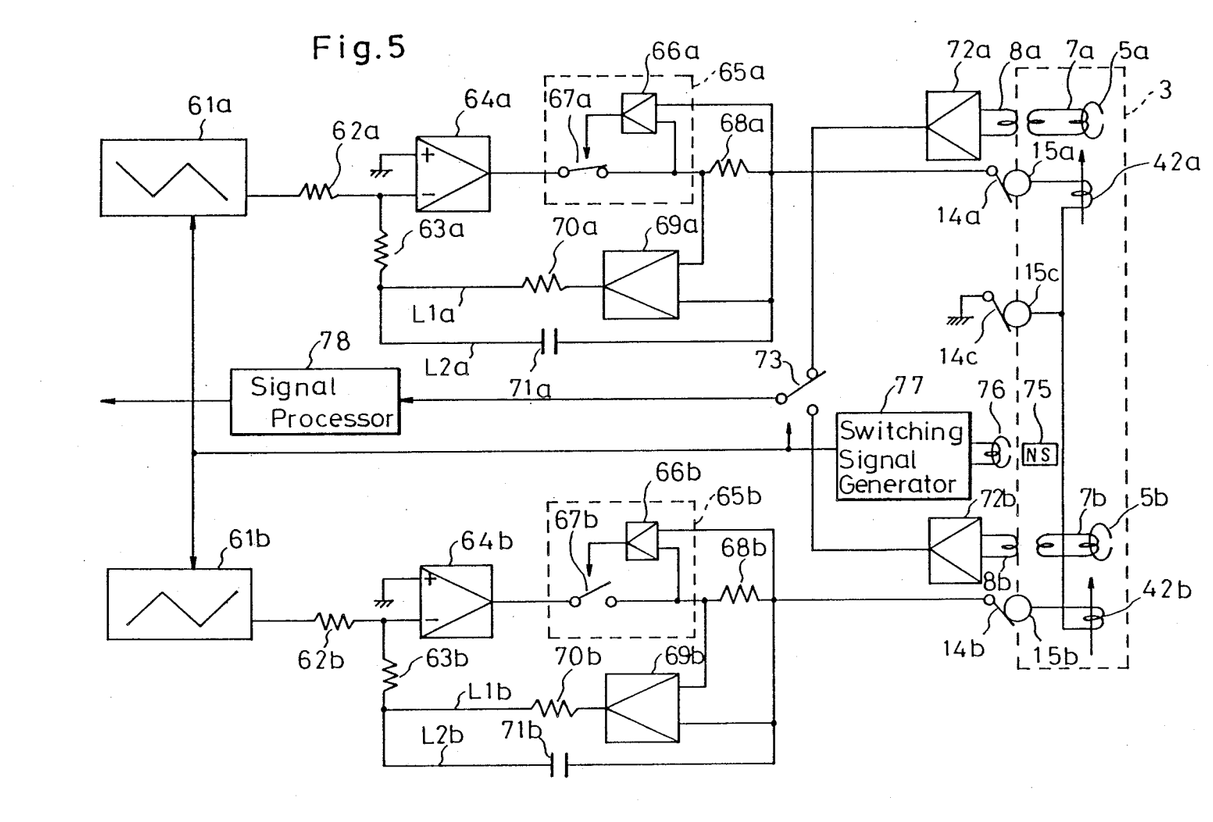
FIG. 5 is a block circuit diagram showing a control circuit.

The control circuitry of the head-carrier drum control system is illustrated in FIG. 5, reference to which will now be made. It is however to be noted that, while in the foregoing description made in connection with the drive unit 4a reference is made only to one of the transducing heads 5, the control circuitry shown in FIG. 5 is shown to have two circuits of substantially identical construction employed one for each of the magnetic transducing heads 5. In view of this, in FIG. 5, the two transducing heads spaced 180° from each other about the axis of rotation of the upper drum half 3 are identified by 5a and 5b, respectively, and component parts of one of the circuits associated with the magnetic transducing head 5a are identified by respective reference numerals having a suffix "a" whereas those of the other of the circuits associated with the magnetic transducing head 5b are identified by respective like reference numerals having a suffix of "b".

Referring now to FIG. 5, each of the circuits associated respectively with the magnetic transducing heads 5a and 5b includes a cyclic signal generator 61a or 61b adapted to be controlled by a switching signal. The switching signal referred to above is generated from a switching signal generator 77 including the magnetic position sensor 76. As hereinbefore described, the magnetic position sensor 76 is used for detecting the passage of the magnet 75 rotatable together with the upper drum half 3 thereby to provide a signal indicative of the position of the upper drum half 3.

An output from the cyclic signal generator 61a or 61b is supplied to a respective drive circuit including an operational amplifier 64a or 64b, a differential amplifier 69a or 69b, a current limiter 65a or 65b, resistors 62a, 63a, 68a, 70a or 62b, 63b, 68b, 70b, and a capacitor 71a or 71b. The drive circuit provides as its output signal the control current to the associated contact brush 14a or 14b which is in turn slidingly engaged with the associated electrode 15a or 15b connected electrically with the respective cylindrical coil assembly 42a or 42b.

As shown, the coil assemblies 42a and 42b associated with the respective magnetic transducing heads 5a and 5b are connected at one end, on a control side, with the respective electrodes 15a and 15b while the coil assemblies 42a and 42b are connected at the other end, on a non-control side, with each other and, also, with the reference electrode 15c to which a reference potential is applied through the grounded contact brush 14c. The control side referred to above means the side towards the driving circuit from the coil assembly 42a or 42b, and the non-control side means the side opposite of the driving circuit from the coil assembly 42a or 42b and being fixed at the reference potential.

The magnetic field developed by each of the coil assemblies 42a and 42b when the control current is supplied thereto reacts with the magnetic force developed by the associated permanent magnet 43 to displace the associated transducing head 5a or 5b in a direction generally widthwise of the length of magnetic tape 13. The amount of displacement of each transducing head 5a or 5b is so chosen as to accomplish the proper tracking, that is, to permit the respective transducing head during the picture reproduction to properly follow the recorded track on the length of magnetic tape 13. The control current referred to above is supplied to the associated coil assembly 42a or 42b even when the transducing head 5a or 5b is not held in sliding contact with the length of magnetic tape 13. The video and/or audio signal picked up by each transducing head 5a or 5b is supplied by the effect of an electromagnetic conversion taking place between the associated rotary and stationary transformers 7a, 7b and 8a, 8b to an associated head amplifier 72a or 72b. Respective amplified signals emerging from the head amplifiers 72a and 72b are in turn supplied to a common signal processor 78 through a switch 73 controlled by the switching signal to pass the amplified signals alternately through such switch 73 and are eventually reproduced in the video display in a manner known to those skilled in the art.

Each of the current limiters 65a and 65b is comprised of a respective window comparator 66a or 66b and a current limiting means 67a or 67b. Each current limiter 65a or 65b is so constructed as to detect the current flowing across the associated resistor 68a or 68b employed to adjust the current through the coil assembly, that is, the current expected to flow across the associated coil assembly 42a or 42b, and then to regulate the current of the control signal to a current value required for the displacement of the associated transducing head 5a or 5b to establish the following relationship.

$$|(\text{Desired Speed Ratio}) - 1| \times (\text{Track Pitch } P) <$$
$$(\text{Limit of Displacement of Head}) < (\text{Structural Limit}$$
$$\text{of Displacement of Head})$$

For this purpose, a voltage across the respective resistor 68a or 68b is fed-back to the associated current limiter 65a or 65b through the associated differential amplifier 69a or 69b by way of the operational amplifier 64a or 64b.

It is to be noted that the Desired Speed Ratio referred to above means a speed ratio relative to the normal tape speed during the reproduction and may take a negative value when the length of magnetic tape is transported in a direction reverse to the direction thereof from the supply reel onto the take-up reel. The Limit of Displacement of Head referred to above means the limit by which, consequent upon the result that the relationship between the value of the current flowing across each of the coil assemblies 42a and 42b and the amount of displacement of any one of the transducing heads 5a and 5b exhibits a linearity, an accurate operation of the drive unit 4a can be guaranteed. The Structural Limit of Displacement of Head referred to above means the limit at which any one of the transducing heads 5a and 5b will not interfere with those component parts that surround such one of the transducing heads 5a and 5b.

It is also to be noted that each of the resistors 63a or 63b is selected to have a resistance higher than that of the associated resistor 70a or 70b, and each of the capacitors 71a or 71b is selected to have an impedance higher than the resistance of the associated coil assembly 42a or 42b.

Hereinafter, the operation of the control circuitry will be described.

Figure 6:
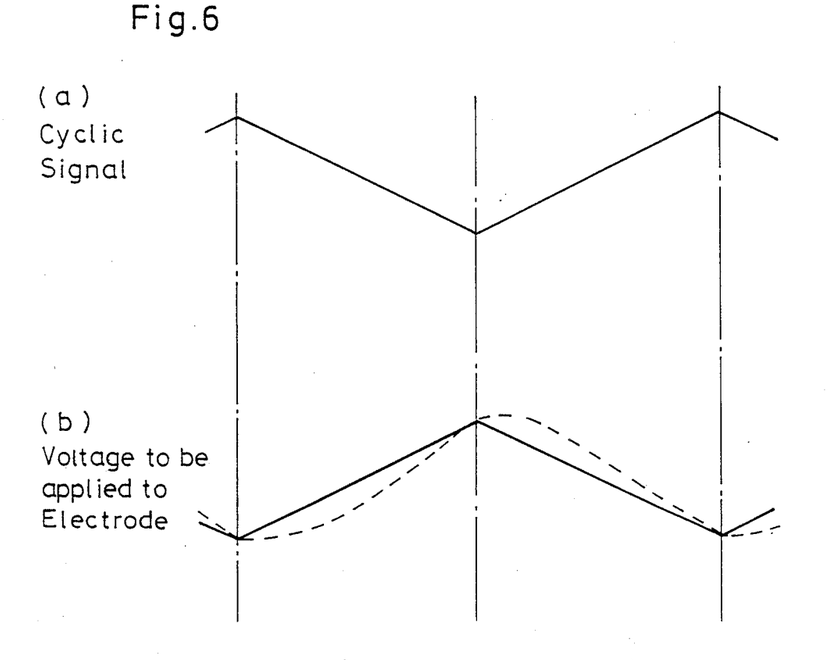
FIG. 6 is a graph illustrating a signal characteristic exhibited when the drive is effected with a current and when the drive is effected with a voltage.

Each of the synchronizing signal generators 61a and 61b generates a signal, shown in FIG. 6(a), of a waveform coinciding with the cycle of rotation of the magnetic transducing heads 5a and 5b, which signal is in turn applied to the corresponding operational amplifier 64a or 64b shown in FIG. 5. The respective operational amplifier 64a or 64b outputs an inverted version of the signal applied thereto from the associated synchronizing signal generator 61a or 61b and applies it to the associated coil assembly 42a or 42b. Accordingly, referring to FIG. 8(c), the displacement of each of the transducing heads 5a and 5b in the direction shown by the arrow T will be zero at the starting point (left-hand lower point) of the relative trace of movement, increasing progressively as the relative trace of movement extends towards the terminating point (right-hand upper point) while depicting the desired trace of movement as shown by the solid line C.

Each of the drive circuits forming the control circuitry includes a current feedback loop L1 and a voltage feedback loop L2 connected parallel to each other; the current feedback loop L1 including the associated differential amplifier 69a or 69b for detecting the voltage across the associated resistor 68a or 68b, that is, the current expected to flow across the associated coil assembly 42a or 42b, and the voltage feedback loop L2 including the associated capacitor 71a or 71b for the feedback of a voltage across the associated resistor 68a or 68b.

Where the frequency is high, the impedance of each capacitor 71a or 71b approaches a zero value and, accordingly, the voltage feedback dominates over the current feedback and the drive operation based on the voltage takes place. On the other hand, where the frequency is low, the impedance of each capacitor 71a or 71b approaches an infinite value and, accordingly, the current feedback dominates over the voltage feedback and the drive operation based on the current takes place. The relationship between the fundamental drive frequency of each of the transducing heads 5a and 5b operable respectively with the coil assemblies 42a and 42b and the mechanical resonant frequency of the drive unit 4a is such that the fundamental drive frequency is lower than the mechanical resonant frequency. Therefore, the current-based drive operation is carried out at a frequency about the fundamental drive frequency, but the voltage-based drive operation is effected at a frequency about the mechanical resonant frequency, so that the counter electromotive force generated across the associated coil assembly 42a or 42b during the voltage-based drive at which the output impedance is low can be absorbed to effect the short-circuited braking.

The control signal shown in FIG. 6(a) to drive the transducing heads 5a and 5b comprises higher harmonic components or noises superimposed to the fundamental drive frequency component. Therefore, when the higher harmonic components have a frequency component equal to the mechanical resonant frequency of the drive unit 4a, the mechanical resonance of the drive unit 4a may occur with the consequence of improper headto-tape tracking. However, the resonance of the drive unit 4a due to the supply of the higher harmonic components having high frequency is absorbed by the short-circuited braking effect as described above, with the consequence of proper head-to-tape tracking.

On the other hand, the drive circuit supplies the fundamental drive frequency component of the drive current through the current-based drive operation. Therefore, regardless of the self-heating of the coil assemblies 42a and 42b due to high output impedance of the drive circuit during the current-based drive operation, and also, regardless of the change of both of the resistance of the coil assemblies 42a and 42b and the contact resistance between the contact feeler 14a and 14b and the electrode means 15a and 15b resulting from the change in ambient temperature, the supply of the drive current (control signal) of the predetermined value can be effected in a stable manner to the drive unit 4a.

It is to be noted that, in order to minimize the difference between the gain during the current-based drive operation and that during the voltage-based drive operation, the following circuit constants are employed. The gain of the differential amplifier 69a The gain of the differential amplifier 69a =

(Resistance Value of Coil Assembly 42a)/(Resistance

Value of Resistor 68a)

The gain of the differential amplifier 69b =

(Resistance Value of Coil Assembly 42b)/(Resistance

Value of Resistor 68b)

As hereinbefore described, by making the gain during the current-based drive relative to a load resistance at a frequency about the fundamental drive frequency which is low coincide substantially with the gain during the voltage-based drive at a frequency about the mechanical resonant frequency of the drive unit which is high, the voltage to be applied to each of the electrodes 15a and 15b can be maintained to exhibit a characteristic curve shown by the solid line in FIG. 6(a) so that the linearity of the control signal can be attained.

Where, by way of example, the gain during the current-based drive and that during the voltage-based drive differ from each other, the output from each cyclic signal generator 61a or 61b which provides an input to the associated drive circuit, that is, the voltage applied to the associated electrode 15a or 15b which voltage corresponds to a linear portion of the cyclic signal shown in FIG. 6(a), will fluctuate as shown by the phantom line in FIG. 6(b) and a loss of linearity may occur in the control signal.

In practice, however, it is not easy to make the gains during the current-based and voltage-based drives equal to each other in view of any possible change in resistance of one or both of the coil assemblies 42a and 42b and also the circuit constants. A series of experiments have proven that the coincidence of the gains within a tolerance of ±3 dB is effective to obtain the practically acceptable linearity of the control signal.

Although in the foregoing description no reference has been made to the angle of inclination of the head gap in each of the transducing heads, that is, the azimuth of the head gap, it is well known that the respective head gaps of the paired transducing heads according to the VHS recording and reproducing system are inclined in opposite directions relative to each other so that one of the transducing heads cannot trace the track formed by the other of the transducing heads. In such a case, since the level of a signal tends to be lowered for each recorded track as shown in FIG. 8(b), the employment of the technique to displace the transducing heads such as in the present invention is more effective.

Although the present invention has fully been described in connection with the preferred embodiment thereof with reference to the accompanying drawings used only for the purpose of illustration, those skilled in the art will readily conceive numerous changes and modifications within the framework of the reading of the specification herein presented of the present invention.

For example, instead of the use of the leaf spring 41 supported in a cantilever fashion, either a torsion spring or a parallel spring may be employed, or a rigid support plate may be employed. Where the rigid support plate is used, the rigid support plate must be supported for movement in a direction towards and away from the permanent magnet 43.

Also, the extension arm 45a shown as forming an integral extension of the ferromagnetic plate 45 may be a non-magnetizeable member separate from the ferromagnetic plate 45 and connected to the plate 45, or may be a member either connected to or formed integrally with the yoke member 44.

The use of the yoke member 44 used to connect the assiciated drive unit to the upper drum half 3 may not be essential in the practice of the present invention. Instead of the use of the yoke member 44, the ferromagnetic plate 45 may be so shaped and so configured as to enable the associated drive unit to be secured therethrough to the upper drum half 3.

Similarly, the use of the support stock 9 shown and described as rigidly mounted on the drive shaft 1 may not be always essential in the practice of the present invention and may therefore be dispensed with, in which case the upper drum half 3 may be mounted direct on the drive shaft.

Yet, other than the three adjustment holes 51a to 51c, one or more extra adjustment holes may be formed in the annular top wall of the upper drum half 3. The bearing hole 49a for the passage of the screw member 49 which has been shown as formed at a location on one side of the permanent magnet 43 towards the drive shaft 1 may be defined at a location on the opposite side of the permanent magnet 43 towards the associated transducing head 5.

Accordingly, such changes and modifications are, unless they depart from the spirit and scope of the present invention as delivered from the claims annexed hereto, to be construed as included therein.

What is claimed is:

1. A head-carrier drum control apparatus which comprises:
   a rotatably supported, generally cylindrical head-carrier drum assembly;
   a drive unit accommodated in said head-carrier drum assembly including coil means, disposed in a magnetic circuit, and at least one positionable magnetic transducing head cooperable with said coil means to displace in a direction generally widthwise of a length of magnetic tape;
   contact feeler means through which a control signal is supplied to said drive unit;

electrode means held in contact with said contact feeler means and connected electrically with said coil means; and drive means including a first drive circuit for driving said drive unit at a frequency associated with the cycle of rotation of said head-carrier drum assembly and at a frequency at least about a fundamental drive frequency through a current-based drive operation and a second drive circuit for driving said drive unit at a frequency about at least a mechanical resonant frequency of said drive unit through a voltage-based drive operation, to cause a trace of movement of said positionable magnetic transducing head depicted during information reproduction to properly follow a track recorded by a magnetic transducing head on said length of magnetic tape during information recording.

2. The apparatus as claimed in claim 1, wherein said drive means is comprised of an amplifier having a current feedback loop and a voltage feedback loop, connected in parallel to said current feedback loop.

3. The apparatus as claimed in claim 1, wherein the gain relative to a load resistance during said current-based drive operation is made equal to that during said voltage-based drive operation.

4. The apparatus as claimed in claim 1, wherein said drive unit comprises a leaf spring made of nonmagnetizable material with said magnetic circuit formed by a magnet member capable of emanating a magnetic force counteracting with a magnetic force which may be developed by said coil means, and a ferromagnetic member forming a part of said magnetic circuit together with said magnetic member wherein said positionable magnetic transducing head is mounted on a first end of said leaf spring and wherein said coil means has a generally cylindrical shape and is mounted on said leaf spring with the longitudinal axis of said coil means oriented in a vertical direction substantially perpendicular to said leaf spring, said coil means being positioned inside an annular gap defined between said ferromagnetic member and said magnet member.

5. The apparatus as claimed in claim 4, wherein said ferromagnetic member has an extension arm extending therefrom in a direction away from said positionable magnetic transducing head, said leaf spring having a second end, opposite said first end, secured to said extension arm.

6. The apparatus as claimed in claim 1, wherein said drive unit comprises a leaf spring made of nonmagnetizable material with said magnetic circuit formed by a magnet member capable of emanating a magnetic force counteracting with a magnetic force which may be developed by said coil means, and a ferromagnetic member forming a part of said magnetic circuit together with said magnet member wherein said positionable magnetic transducing head is mounted on a first end of said leaf spring and wherein said coil means has a generally cylindrical shape and is mounted on said leaf spring with the longitudinal axis of said coil means oriented in a vertical direction substantially perpendicular to said leaf spring, said coil means being positioned inside an annular gap defined between said ferromagnetic member and said magnet member.

7. The apparatus as claimed in claim 6, wherein said ferromagnetic member has an extension arm extending therefrom in a direction away from said positionable magnetic transducing head, said leaf spring having a second end, opposite said first end, secured to said extension arm.

8. A head-carrier drum control apparatus which comprises:

a rotatably supported, generally cylindrical head-carrier drum assembly;

a drive unit accommodated in said head-carrier drum assembly including coil means, disposed in a magnetic circuit, and at least one positionable magnetic transducing head cooperable with said coil means to displace in a direction generally widthwise of a length of magnetic tape;

contact feeler means through which a control signal is supplied to said drive unit;

electrode means held in contact with said contact feeler means and connected electrically with said coil means; and a drive circuit for supplying an electric current, during a current-based drive operation and a voltage-based drive operation, to drive said drive unit in the vicinity of a fundamental drive frequency associated with the cycle of rotation of said head-carrier drum assembly through said current-based drive operation and to drive said drive unit at a higher frequency than said fundamental drive frequency through said voltage-based drive operation to cause a trace of movement of said positionable magnetic transducing head depicted during information reproduction to properly follow a track recorded by a magnetic transducing head on said length of magnetic tape during information recording.

9. The apparatus as claimed in claim 8, wherein said drive circuit is comprised of an amplifier having a current feedback loop.

10. The apparatus as claimed in claim 8, wherein said drive circuit is comprised of an amplifier having a voltage feedback loop.

* * * * *